Aug. 16, 1955    R. W. HOFHEIMER    2,715,537
COUPLING OR CONNECTING DEVICE
Filed Dec. 4, 1952

INVENTOR
Richard W. Hofheimer
BY
ATTORNEY

United States Patent Office 2,715,537
Patented Aug. 16, 1955

2,715,537

COUPLING OR CONNECTING DEVICE

Richard W. Hofheimer, Cambridge, Mass.

Application December 4, 1952, Serial No. 323,996

9 Claims. (Cl. 287—54)

The present invention relates to coupling or connecting devices, and, more particularly, to coupling devices for securely connecting together transversely disposed cables, wires, rods, tubes and the like.

Such a coupling has a wide variety of application, for example, in furniture, erector toys, structural frames for racks or shelves and other devices where it is desirable to secure angularly disposed members.

It is a principal object of the present invention to provide a simple and efficient means for assembling custom built frames with a minimum of tools, and without the use of soldering, welding, or brazing equipment.

It is still another object of the present invention to provide a simple and efficient means for building frames of a variety of shapes and sizes, which frames may be quickly and easily disassembled and the component parts reused to build other devices.

It is still another object of the present invention to provide a highly improved coupling or connection for angularly disposed members.

It is a further object of the present invention to provide a coupling for connecting panels to bars or round stock.

It is still a further object of the present invention to provide a coupling which simultaneously embraces angularly disposed members.

It is still a further object of the present invention to provide a coupling comprising opposed members movable toward and away from each other, and means for effecting the movement of the members, said means being movable toward and away from each other upon effecting the movement of said members.

It is yet a further object of the present invention to provide a coupling of the type described which is simple and durable, which is effective for its intended purposes, and which may be manufactured and sold at a reasonable cost.

Other objects of this invention will in part be obvious and in part hereinafter pointed out.

For further comprehension of the invention, and of the objects and advantages thereof, reference will be had to the following description and accompanying drawing, and to the appended claims in which the various novel features of the invention are more particularly set forth.

In the accompanying drawing in which are shown various illustrative embodiments of this invention:

Figures 1, 2, 3, 4, 5:
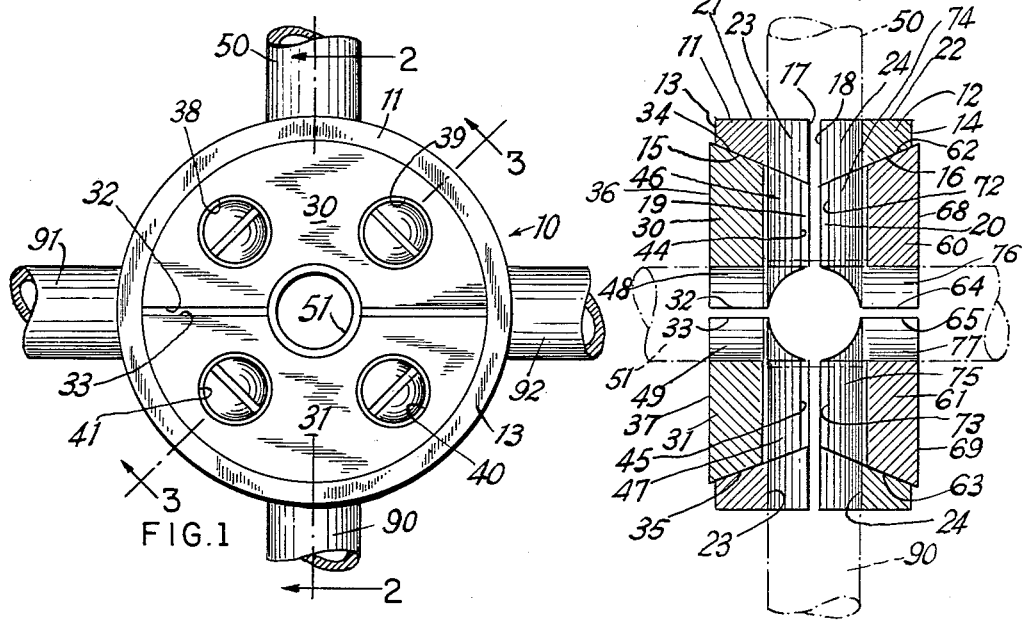
Fig. 1 is a plan view of a device constructed in accordance with the present invention and showing a plurality of members secured therein.
Fig. 2 is a sectional view taken on the line 2—2 of Fig. 1.
Fig. 3 is a sectional view taken on the line 3—3 of Fig. 1 and showing a cover for the device.
Fig. 4 is a perspective view of the device showing a plurality of members secured therein.
Fig. 5 is a sectional view similar to Fig. 2 and showing a means for securing a panel to the coupling.

Referring now more particularly to the drawings, the coupling of the present invention, generally designated 10, comprises a pair of opposed members 11 and 12, which for the purpose of illustration are shown as of annular form. Extending inwardly from the outer faces 13 and 14 of the members 11 and 12, respectively, are tapering surfaces 15 and 16, which open through the inner surfaces 17 and 18 of the members. The tapering surfaces 15 and 16 form apertures 19 and 20, and when the members 11 and 12 are arranged with their inner surfaces 17 and 18 in facing relation with respect to each other, the apertures are in registry. Extending inwardly from the peripheral edges 21 and 22 of the members 11 and 12 are a plurality of spaced cut out portions 23 and 24 which open through the tapering surfaces 15 and 16 and the inner surfaces 17 and 18. While the cut out portions 23 and 24 are illustrated as semi-cylindrical in form, it is appreciated that the cut out portions may be of other shapes without departing from the scope of the invention. The cut out portions of the member 11 are arranged opposite the cut out portions of the member 12 for a purpose to be described hereinafter.

Arranged within the member 11 are a pair of members or plates 30 and 31 which are arranged in edge to edge facing relation with respect to each other. The plates 30 and 31 are conformably received within the member 11 and, for the purpose of illustration, are shown as being semi-circular in form. The facing edges 32 and 33 of the plates 30 and 31, respectively, are shown as being spaced apart, and the peripheral edges 34 and 35 are beveled or tapered for sliding engagement with the tapered surface 15 of the member 11. By this construction, the plates 30 and 31 are enabled to move toward and away from each other while moving inwardly and outwardly with respect to the member 11.

The outer surfaces 36 and 37 of the plates 30 and 31, respectively, are provided with spaced recesses 38, 39, 40 and 41, which recesses are formed with central bores 42 and 43 opening through the inner surfaces 44 and 45 of the plates 30 and 31. Extending inwardly from the peripheral edges 34 and 35 of plates 30 and 31, respectively, are cut out portions 46 and 47 which are shown, for the purpose of illustration, as semi-cylindrical in form, and which open through the inner surfaces 44 and 45 and through the notches 48 and 49 in the facing edges 32 and 33. The cut out portions 46 and 47 are arranged to communicate with and form extensions of the cut out portions 23. Extending inwardly through the outer surfaces 36 and 37 of the plates 30 and 31, respectively, are the pair of notches or opposed cut out portions 48 and 49 which open through the facing edges 32 and 33 and also through the inner surfaces 44 and 45.

The cut out portions 23 and 24 are adapted to receive rod or tube stock 50 therebetween, and the cut out portions 48 and 49 are also adapted to receive the rod or tube stock 51 therebetween. If the plates 30 and 31 are moved toward the member 12, the members 11 and 12 will be caused to clamp therebetween the stock 50 and simultaneously, the plates 30 and 31 will be caused to clamp therebetween the stock 51, the clamping action of the plates 30 and 31 being in a direction transverse of the clamping action of members 11 and 12.

Within the member 12 are disposed a pair of plates 60 and 61 similar to the plates 30 and 31, and having their peripheral edges 62 and 63 beveled or tapered for sliding engagement with the surface 16 of member 12. Similarly, the facing edges 64 and 65 are movable toward and away from each other upon movement of the plates 60 and 61 inwardly and outwardly with respect to the member 12. The plates 60 and 61 are formed with recesses 66 and 67 extending inwardly from the outer surfaces 68 and 69. Centrally of the recesses 66 and 67 are formed holes or bores 70 and 71 which open through the inner surfaces 72 and 73 of the plates 60 and 61. The plates 60 and 61 are also formed with cut out portions 74 and 75 which correspond to the cut out portions 46 and 47 and are arranged in registry with the cut out portions 24. Extending inwardly from the outer surfaces 68 and 69 of the plates 60 and 61 are cut out portions 76 and 77 which open through notches 74 and 75 of the facing edges 64 and 65 and the inner surfaces 72 and 73. The cut out portions 76 and 77 are shown, for the purposes of illustration, as semi-circular, are arranged in opposed relation with respect to each other, and are in alignment with the cut out portions 48 and 49 of the plates 30 and 31.

Extending through the bores 42 and 43 are threaded fasteners or bolts 80 and 81 which have their heads seated in recesses 38, 39, 40 and 41 and have their other end extending through and beyond bores 70 and 71 and into recesses 66 and 67. In the recesses 66 and 67 and threaded on the ends of bolts 80 and 81 are nuts 82 and 83.

In operation, with the bolts 80 and 81 loosened, the members 11 and 12 will be loosely spaced from each other, and the plates 30 and 31 are loosely spaced from the plates 60 and 61. Also, with the bolts 80 and 81 slightly loosened, the plates 30 and 31 will be freely shiftable toward and away from each other, as will the plates 60 and 61. With the plates 30 and 31 shifted away from each other, the elongated member 51 may be inserted between the plates within the cut out portions 48 and 49, and may be further extended through the plates 60 and 61 within the cut out portions 76 and 77. While the member 51 is shown as a single rod or tube extending through and beyond the outer surfaces of the plates 30, 31, 60 and 61, it is appreciated that the member 51 need not extend beyond the plates and may be formed of two spaced members as desired. With the annular members 11 and 12 moved away from each other, and the plates 30 and 60 also moved away from each other, an elongated member 50 may be inserted into the cut out portions 23 and 24 and 46 and 74. Similarly, the member 90 may be inserted between the members 11 and 12, and the plates 31 and 61 in alignment with the member 50. If separate spaced members are substituted for the member 51, the members 50 and 90 may be integrally formed and extend completely through and beyond the peripheral edges of the members 11 and 12. The members 11 and 12 are each formed with four cut out portions like 23 and 24, to accommodate four radially extending elongated members 50, 90, 91 and 92. The number of elongated members accommodated may be greater or less. If desired, plugs may be substituted for rods or tubes where less than the maximum number of openings 23, 24 are occupied by such rods or tubes. The same is true of openings 48, 49 and 76, 77. With elongated members in position, the bolts 80 and 81 are tightened to draw the members 30 and 60 toward each other, and likewise the members 31 and 61 toward each other. This action will effect movement of the members 11 and 12 toward each other to clamp the members 50 and 90 firmly in position. Simultaneously, the plates 30 and 31 will slidably engage the tapering surface 15 and be moved toward each other, as will the plates 60 and 61, whereby the member 51 will be firmly clamped in position. To release the clamped members from the device it is only necessary to loosen the bolts 80 and 81.

Continuing to loosen the bolts will result in disassembly of the device, which may be desired for removing or replacing a component part.

In many applications, it is desirable to have a coupling element having particular surface ornamentation. This may easily be accomplished in the instant case by utilizing the covers 100 as shown in Fig. 3. The covers 100 serve to conceal the nut and bolt of the coupling and are provided with peripheral flanges 93 and 94 which embrace the members 11 and 12, respectively, to hold the covers on the elements. Of course, the covers may be ornamented in any desired manner consistent with the article in which it is used.

If it is desired to connect the tube stock 51 to a panel or plate 95, it is only necessary to substitute an internally threaded plug 96 for one of the elongated members 50 or 90. The panel 95 may then be positioned adjacent the plug 96 having its aperture 97 in registry with the plug, and a bolt 98 inserted through the aperture 97 and threaded into the plug 96. If the device is used in this manner, it is preferred to insert a plug 99 opposite the plug 96 to preserve the spacing of the members 11 and 12.

In similar manner, a panel such as panel 95 may be attached to a plug inserted in an opening 23, 24 or 48, 49 or 76, 77.

The coupling device may be made of metal, plastic, wood or any other suitable material. From the foregoing it is seen that a coupling device is provided which is simple and efficient in operation, which does not require soldering, welding, or brazing, which may be used and reused indefinitely, and which requires a minimum of tools.

Although the horizontal rods are shown in the drawing to be spaced apart 90°, it will be understood that they may be spaced at any desired angle such as 120° apart, 60°, and the like.

Furthermore, it will be understood although a pair of wedges are shown to be received in each annular ring, more than two such wedges may be received therein.

Although the vertical rod 51 is shown to pass entirely through the coupling member, it will be understood that one of the horizontal rods may pass entirely through the coupling member while the vertical rod may be replaced by one or a pair of vertical rods each projecting into the coupling member but not passing therethrough.

A dominant feature of the invention is the fact that when the wedges 30, 31, are drawn toward the wedges 60, 61, the rings 11 and 12 are clamped against the horizontal rods 50, 90, 91, 92 and, at the same time, the wedges are pressed against the vertical through rod or tube 51.

It is also apparent that a coupling device is provided which accomplishes its intended objects and which is adapted to meet practical conditions of use.

It is understood that changes in the construction and arrangement of the parts of the device will occur to those skilled in the art without departing from the spirit and purpose of the invention. Hence, it is my intention to cover by the claims appended hereto any modified forms of structure, of use, and of equivalents which may be reasonably included within their scope.

Having thus described my invention, I claim as new and desire to secure by Letters Patent:

1. A coupling device comprising a pair of opposed members arranged in facing relation with respect to each other, releasable means for effecting movement of said members toward each other for clamping an element arranged therebetween, said means including two other pairs of opposed members, one pair being within each of the first opposed members and arranged therein in facing relation with respect to each other and movable toward each other, and means for moving the members of each of said other pairs of members toward each other for clamping an element arranged therebetween, upon operating said releasable means for effecting movement of the first pair of opposed members toward each other.

2. A coupling device comprising opposed members arranged in facing relation with respect to each other, releasable means for effecting movement of said members toward each other for clamping an element arranged therebetween, said means including a group of other opposed members within each of said first opposed members arranged in facing relation with respect to each other and movable toward each other, and means for moving the other opposed members of each group toward each other for clamping an element arranged therebetween upon actuating said releasable means to draw said first opposed members toward each other, said other opposed members being movable transversely of said first named members upon effecting movement of the first named members toward each other.

3. A coupling device comprising opposed members arranged in facing relation with respect to each other, releasable means for effecting movement of said members toward each other for clamping an element arranged therebetween, said means comprising two pairs of opposed members one pair arranged in facing relation with respect to the other within each of said first named members, and means for moving the members of each of said last named pairs toward each other upon actuating the releasable means for effecting clamping movement of said first named members.

4. The combination of claim 3, said first pair of opposed members having notches on their facing sides to receive said element therebetween, and said last named pairs of opposed members having notches to receive said other element therebetween.

5. A coupling device comprising opposed members arranged in facing relation with respect to each other, releasable means for effecting movement of said members toward each other for clamping an element arranged therebetween, said releasable means comprising two pairs of opposed members arranged one pair each in facing relation with respect to the other within each of said first named members, means for drawing the members of each of said pairs toward each other upon actuating said releasable means for effecting the clamping movement of said first named members, said draw means extending between adjacent members of said pairs of members for actuating the movement of said first members toward each other.

6. In combination, a pair of coaxial annular rings formed with tapered openings convergent toward a plane between said annular rings, a plurality of wedge shaped clamping blocks within each ring formed with outer tapering surfaces contacting the tapered surface of said ring, said wedge blocks being formed with complementary notches to form a through opening coaxial with said rings, to receive a rod passing through said coaxial opening, and means to draw the wedge blocks in one ring toward the wedge blocks in the other ring, whereby said rings will be clamped against the rods received therebetween and said wedge blocks will at the same time clamp the rod passing through said coaxial opening.

7. The combination of claim 6, said annular rings being formed with complementary notches to receive rods therebetween.

8. The combination of claim 7, said wedge blocks being formed at their facing surfaces with notches in alignment with the notches in said annular rings.

9. The combination of claim 6, said drawing means comprising bolts passing through registering openings in said wedge blocks.

References Cited in the file of this patent

UNITED STATES PATENTS

| | | |
|---|---|---|
| 1,507,316 | Kemper et al. | Sept. 2, 1924 |
| 1,809,408 | Goeller | June 9, 1931 |
| 1,918,607 | Lindh | July 18, 1933 |
| 2,243,687 | Sutherland | May 27, 1941 |
| 2,410,875 | Segal | Nov. 12, 1946 |

FOREIGN PATENTS

| | | |
|---|---|---|
| 609,178 | Great Britain | Sept. 27, 1948 |
| 659,397 | Germany | May 2, 1938 |